April 29, 1924.
J. B. MURRAY ET AL
WELDING SEGMENTS OF HOLLOW ARTICLES
Filed July 24, 1923
1,492,258
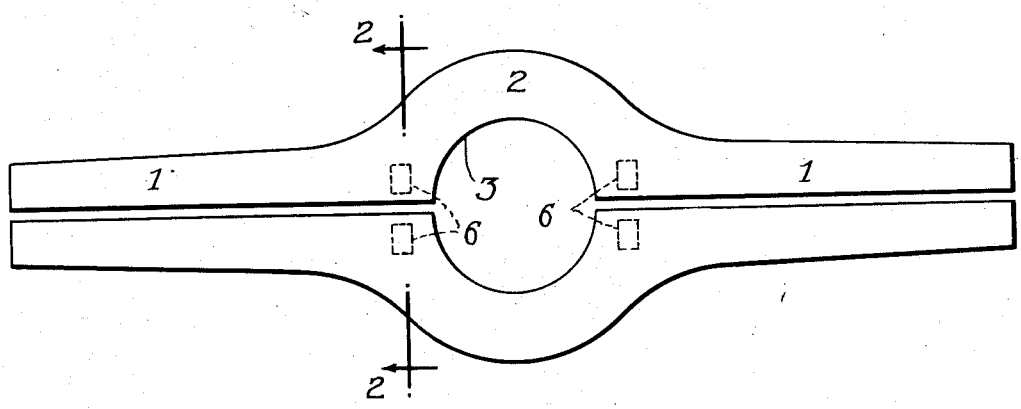
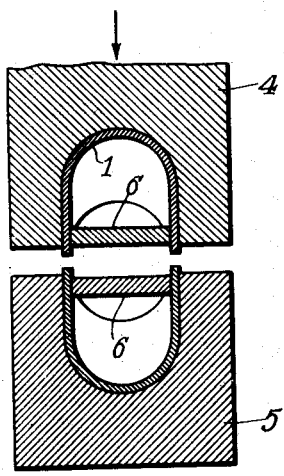
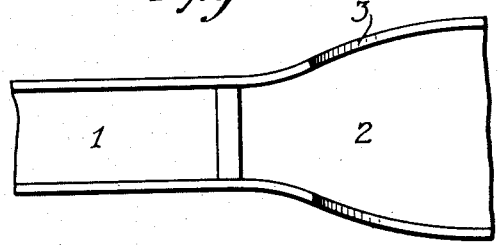
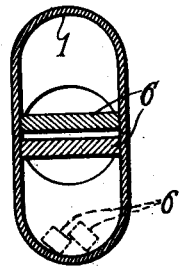
Inventors
Joseph B. Murray
Thomas E. Murray, Jr.
By His Attorney Patented Apr. 29, 1924.

1,492,258

UNITED STATES PATENT OFFICE.

JOSEPH B. MURRAY AND THOMAS E. MURRAY, JR., OF BROOKLYN, NEW YORK.

WELDING SEGMENTS OF HOLLOW ARTICLES.

Application filed July 24, 1923. Serial No. 653,452.

REISSUED

*To all whom it may concern:*

Be it known that we, JOSEPH B. MURRAY and THOMAS E. MURRAY, Jr., citizens of the United States, and residents of Brooklyn, in the county of Kings and State of New York, respectively, have invented certain new and useful Improvements in Welding Segments of Hollow Articles, of which the following is a specification.

In previous patents of ourselves and others there is described the making of rear axle housings for automobiles and similar hollow or tubular products by welding together the edges of sheet metal segments of approximate shape. The invention provides methods and devices applicable to such operations. The accompanying drawings illustrate an embodiment of the invention in which—

Fig. 1 is a side elevation of two segments of a rear axle housing;

Fig. 2 is a section of the same on the line 2—2 of Fig. 1 of the electrodes and certain inserted blocks in position for welding the parts together;

Fig. 3 is a plan view of a fragment of one of the segments;

Fig. 4 is a section on the same plane as Fig. 2 showing the segments welded.

Each of the segments comprises end portions 1 and a central enlarged portion 2 cut out at the edges 3 to form a transverse opening through the finished housing. The end portions 1 are of substantially uniform width throughout their length, flaring at the center as indicated in Fig. 3, and are of gradually increasing depth as shown in Fig. 1. Housings are made in various other shapes and proportions, and it will be understood that the invention is not limited to the particular design shown.

The segments are welded to each other along their edges by forcing such edges together between opposite electrodes 4 and 5 and passing a welding current across the joint. Preferably the operation is carried out as described in our Reissue Patent No. 15,466 of October 10th, 1902, by the passage of currents of extraordinarily high amperage continuing for a very small period of time, generally a fraction of a second. In this operation, particularly, and to some extent in other electric welding operations, it is difficult to secure a perfect register of the edges to be joined and to maintain such register during the entire welding operation.

In a patent of Murray and Murray No. 1,420,735 of June 27th, 1922, an apparatus is described for taking care of a similar difficulty in the case of welding edges of sheet metal segments. But the specific apparatus there illustrated is not conveniently applicable to the making of such an axle housing as is indicated herein except for holding the ends of the segments in position. The intermediate parts, as along the section line 2—2 and adjacent thereto, are larger than the ends of the blanks and are therefore not readily accessible through such ends. But these intermediate parts of the blanks are deeper than the end portions and the vibration at the edges and the difficulty in maintaining registration are greater than at the ends.

We propose to meet the difficulty by introducing temporary wedges or blocks 6 which serve to press the edges of the segments out against the walls of the embracing electrodes and to hold such edges stiff and in accurate registration during the welding operation. These are simple blocks of steel or other suitable material preferably slightly tapering so that, the segments being placed in the electrodes, the blocks can be driven in the position shown. Or they may be set in place before the segments are located in the electrodes. They are easily introduced while the segments are separated through the open edges thereof. They may be placed at any one or more points along the length of the segments. The weakness is greatest at the ends of the straight edges and particularly at the inner ends near the transverse opening 3, and it will generally be sufficient to insert the blocks near such edges. After the welding operation the blocks can be driven out with a rod or similar tool. Their length is just sufficient for the purpose described, and their width and thickness are such that when they are dislodged and fall lengthwise into the tubular structure they can be readily withdrawn therefrom either through the central opening or through the ends, That is, their cross-sectional dimensions are less than those of the interior of the axle housing or other product manufactured. For example, when dislodged, they will fall to the bottom of the tubular structure as indicated in dotted lines in Fig. 4.

Though we have described with great particularity of detail a certain specific embodiment of our invention, yet it is not to be understood therefrom that the invention is restricted to the particular embodiment disclosed. Various modifications thereof in detail and in the arrangement of the parts may be made by those skilled in the art without departure from the invention as defined in the following claims.

What we claim is:—

1. The method of welding segments of hollow articles which consists in pressing said segments at the edges between electrodes bearing on the outer faces of the segments while holding said edges properly spaced by means of blocks introduced between them and separated from the electrodes.

2. In the welding of the edges of sheet metal segments, the method of holding such a segment rigidly in place within an embracing electrode which consists in introducing between the opposite sides of the segment a block which is separate from the electrode and forces the sides of the segments against the electrode.

3. The method of making an axle housing which consists in forming segments thereof of sheet metal and pressing said segments together at the edges between electrodes bearing on the outer faces of the segments while holding said edges properly spaced by means of blocks introduced between them and separated from the electrodes.

4. The combination with electrodes adapted to embrace sheet metal segments of separate blocks adapted to be introduced at desired points in the length of the segments to press the sides outward against the electrodes and to hold the edges rigidly during the welding operation.

In witness whereof, we have hereunto signed our names.

JOSEPH B. MURRAY.
THOMAS E. MURRAY, Jr.